(12) United States Patent
Otomo et al.

(10) Patent No.: US 6,310,734 B1
(45) Date of Patent: Oct. 30, 2001

(54) IMAGING LENS AND IMAGE READOUT APPARATUS USING THE SAME

(75) Inventors: Ryoko Otomo; Takayuki Noda; Hiromitsu Yamakawa, all of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/510,148

(22) Filed: Feb. 22, 2000

(30) Foreign Application Priority Data

Mar. 4, 1999 (JP) .................................................. 11-056568

(51) Int. Cl.$^7$ ....................................................... G02B 9/62
(52) U.S. Cl. ........................... 359/758; 359/763; 359/764; 359/767
(58) Field of Search .................................... 359/758, 757, 359/771, 754, 763, 764, 767, 770

(56) References Cited

U.S. PATENT DOCUMENTS

| | | | | |
|---|---|---|---|---|
| 3,088,371 | * | 5/1963 | Lowenthal | 359/740 |
| 3,302,991 | * | 2/1967 | Bechtold | 359/758 |
| 3,439,976 | * | 4/1969 | Lynch | 359/758 |
| 3,592,531 | * | 7/1971 | McCroble | 359/758 |
| 3,871,749 | * | 3/1975 | Harada | 359/758 |
| 4,319,810 | * | 3/1982 | Mori | 359/771 |
| 6,028,720 | * | 2/2000 | Wartmann et al. | 359/758 |

OTHER PUBLICATIONS

Japanese Patent Office, Patent Abstracts of Japan, Publication No.: 10253881 A, Date of Publication: Sep. 25, 1998, Application No. 9–70402.

* cited by examiner

*Primary Examiner*—Evelyn A Lester
(74) *Attorney, Agent, or Firm*—Snider & Associates; Ronald R. Snider

(57) ABSTRACT

An imaging lens comprises, successively from an object side, a positive first lens $L_1$ having a convex surface directed onto the object side, a negative second lens $L_2$ having a concave surface directed onto an image side, a third lens $L_3$ of a positive meniscus form having a convex surface directed onto the object side, a fourth lens $L_4$ of a positive meniscus form having a convex surface directed onto the image side, a negative fifth lens $L_5$ having a concave surface directed onto the object side, and a positive sixth lens $L_6$ having a convex surface directed onto the image side, the first lens $L_1$ and the second lens $L_2$ being cemented to each other, the fifth lens $L_5$ and the sixth lens $L_6$ being cemented to each other, the imaging lens satisfying the following conditional expressions:

$0.01 < d_6/f < 0.17$ $0.9 < f_3/f < 1.8$ $-0.4 < f/f_{12} < 0.4$ $0.51 < f_{34}/f < 0.72$ $1.15 < v_1/v_2 < 1.65$ where
f is the focal length of the whole system;
$f_3$ is the focal length of the third lens;
$f_{12}$ is the composite focal length of the first and second lenses;
$f_{34}$ is the composite focal length of the third and fourth lenses;
$d_6$ is the distance between the sixth and seventh surfaces; and
$v_1$ and $v_2$ are the respective Abbe numbers of materials of the first and second lens.

10 Claims, 16 Drawing Sheets

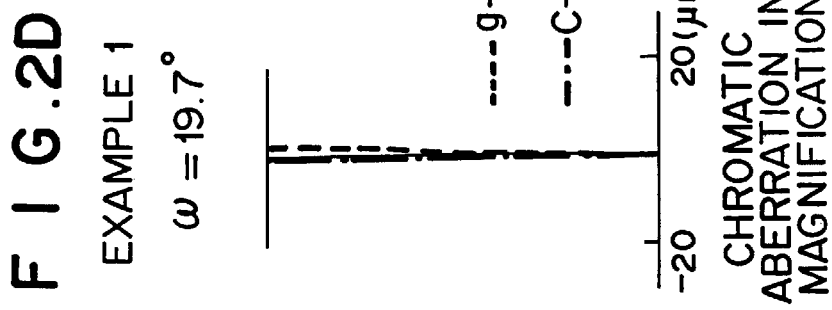
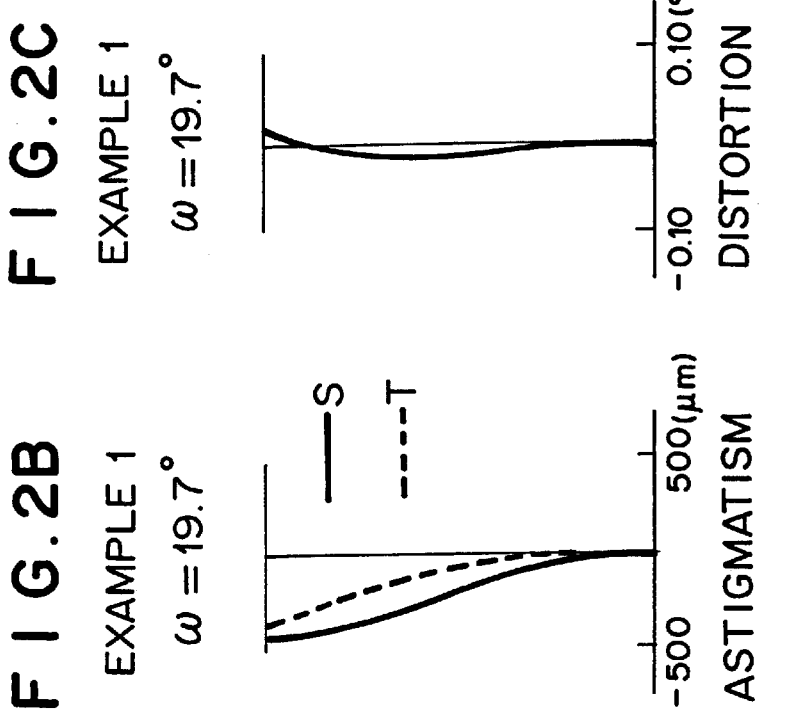
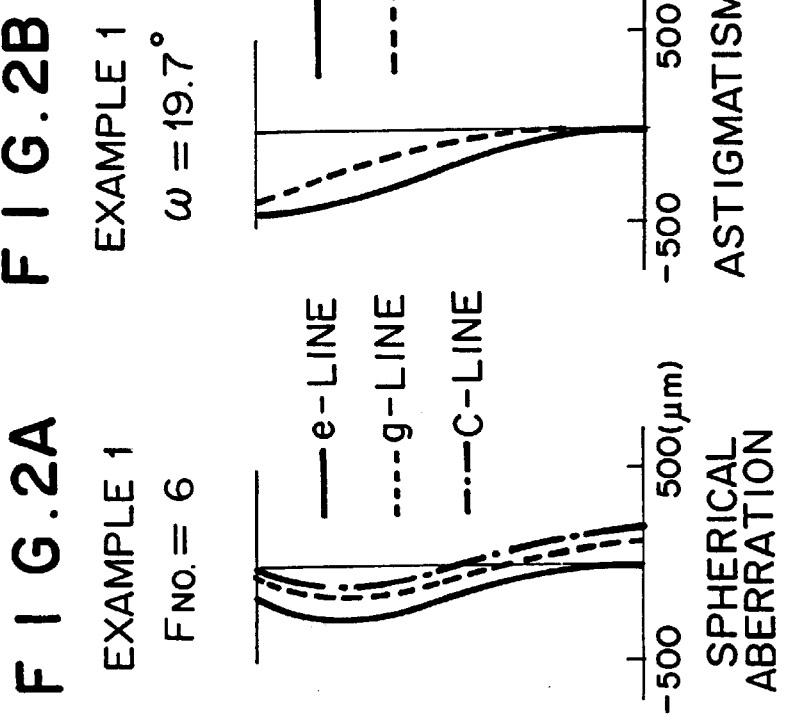

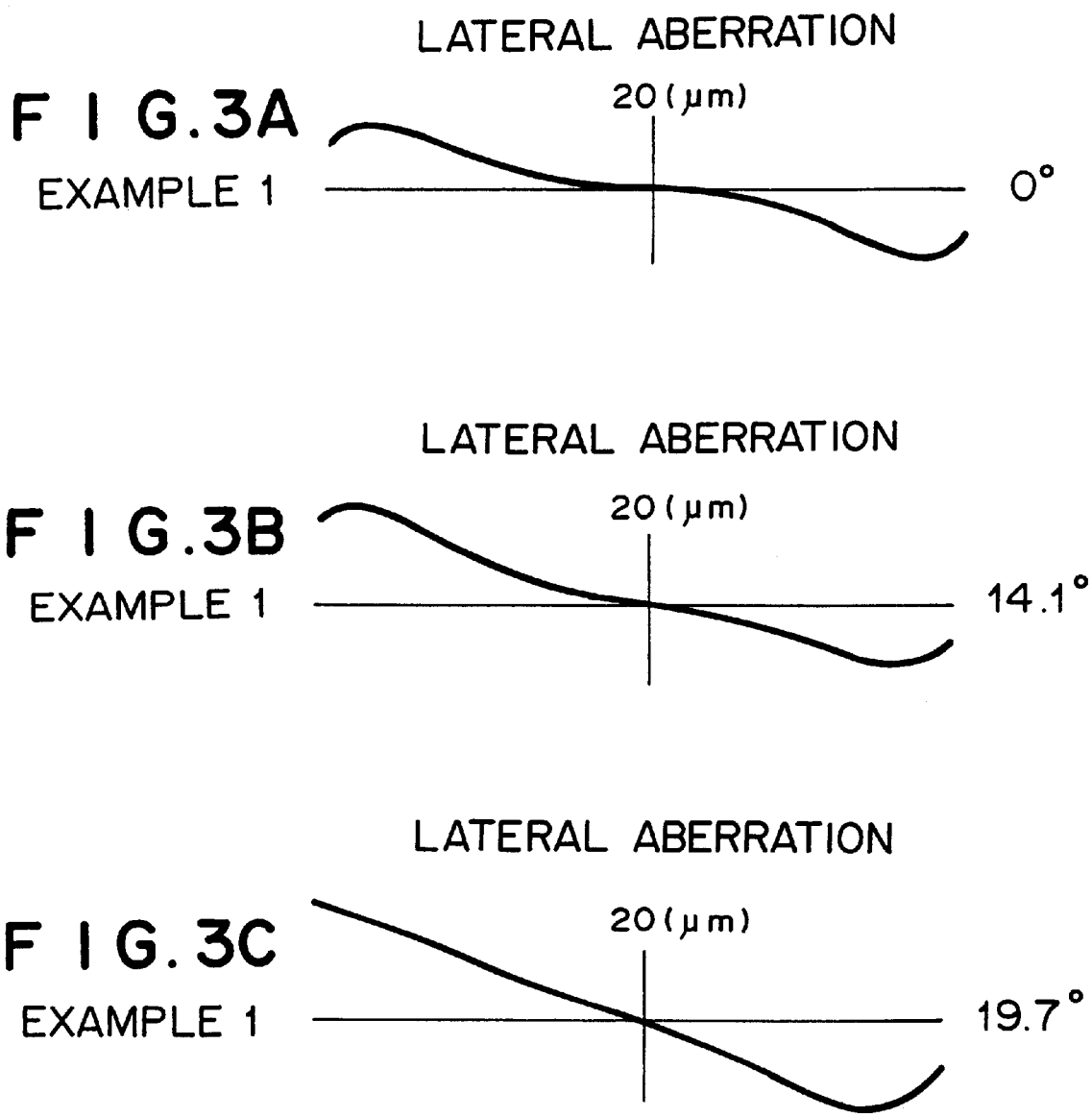

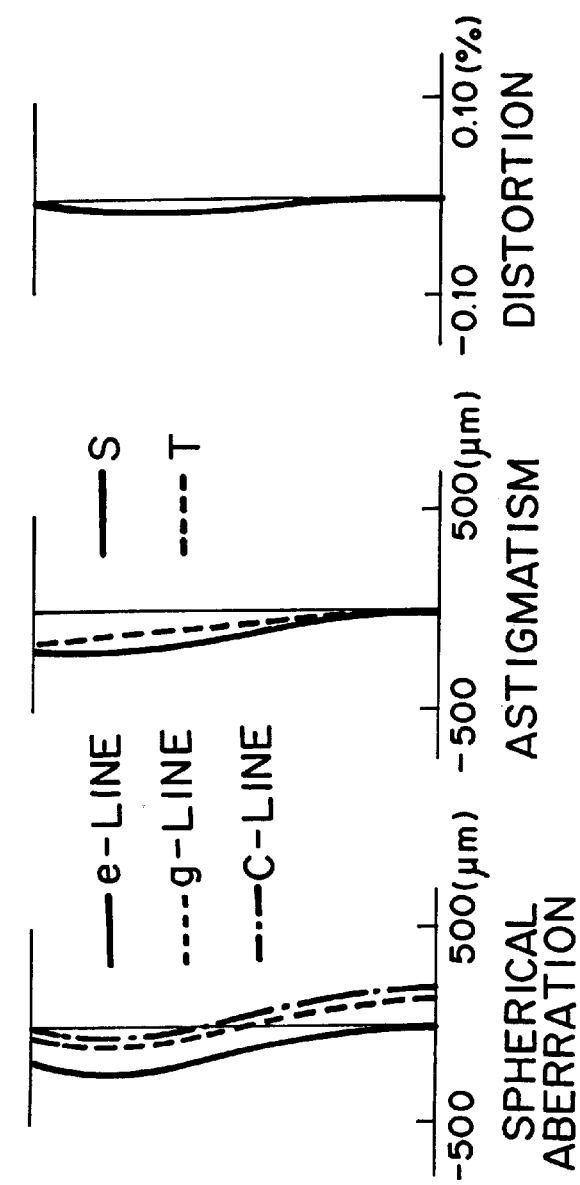

EXAMPLE 2

LATERAL ABERRATION
20 (μm)
0°

EXAMPLE 2

LATERAL ABERRATION
20 (μm)
12.3°

EXAMPLE 2

LATERAL ABERRATION
20 (μm)
17.3°

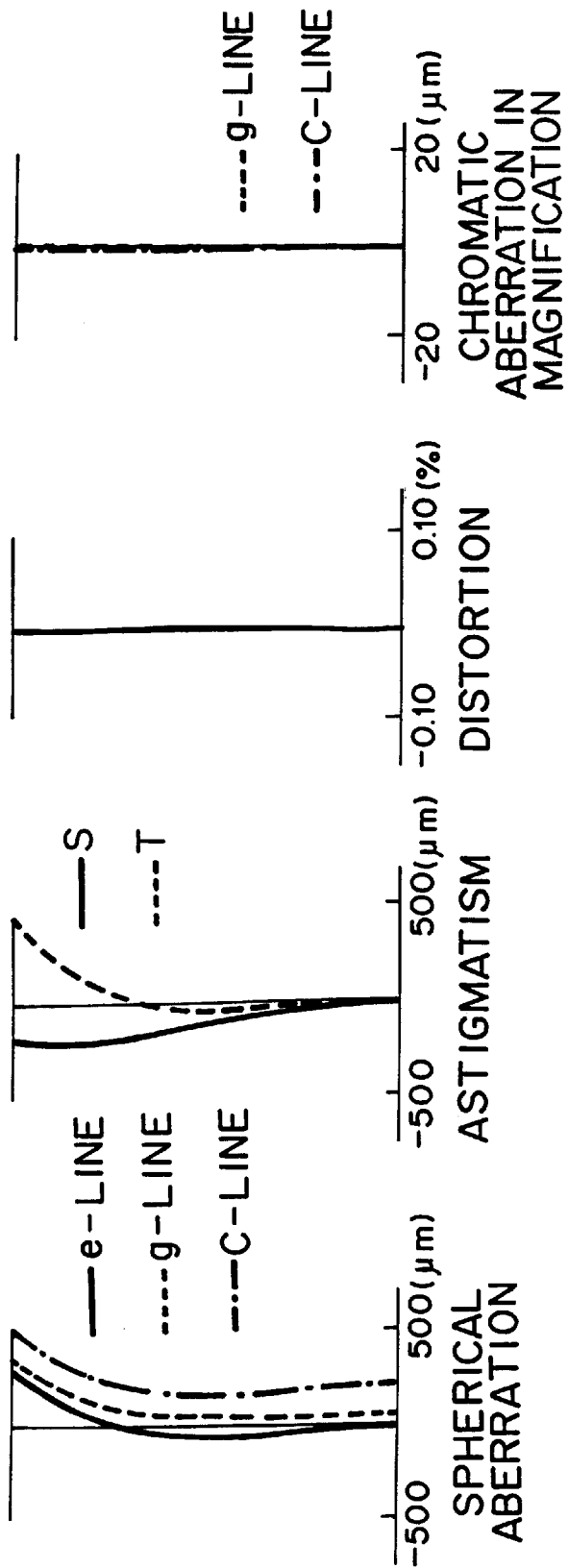

LATERAL ABERRATION

EXAMPLE 3

0°

LATERAL ABERRATION

EXAMPLE 3

12.3°

LATERAL ABERRATION

EXAMPLE 3

17.3°

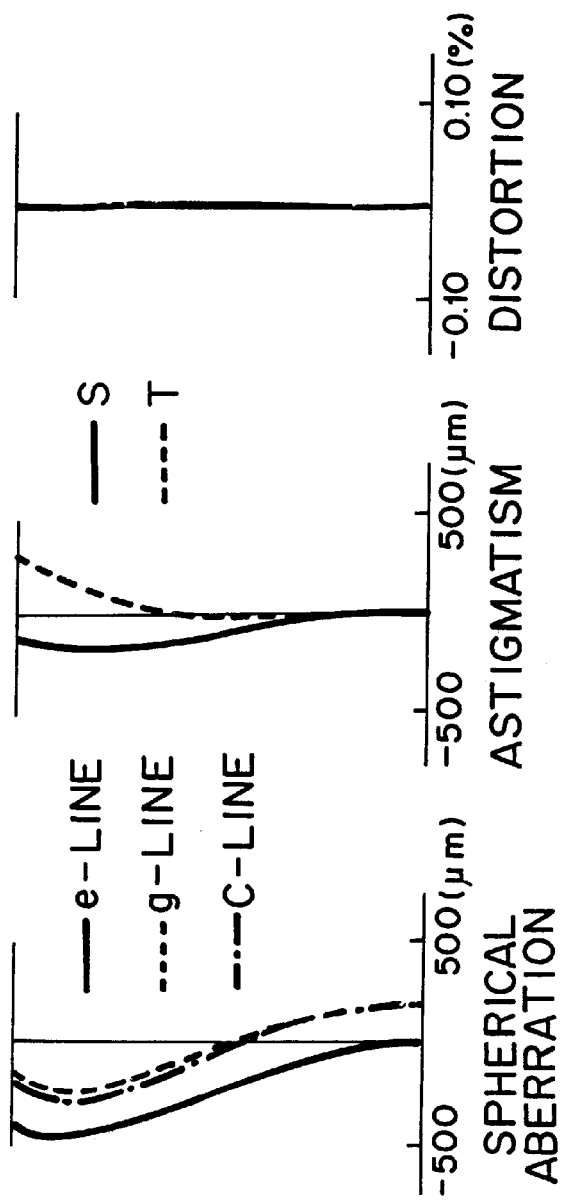

EXAMPLE 4

LATERAL ABERRATION
20 (μm)
0°

EXAMPLE 4

LATERAL ABERRATION
20 (μm)
12.3°

EXAMPLE 4

LATERAL ABERRATION
20 (μm)
17.3°

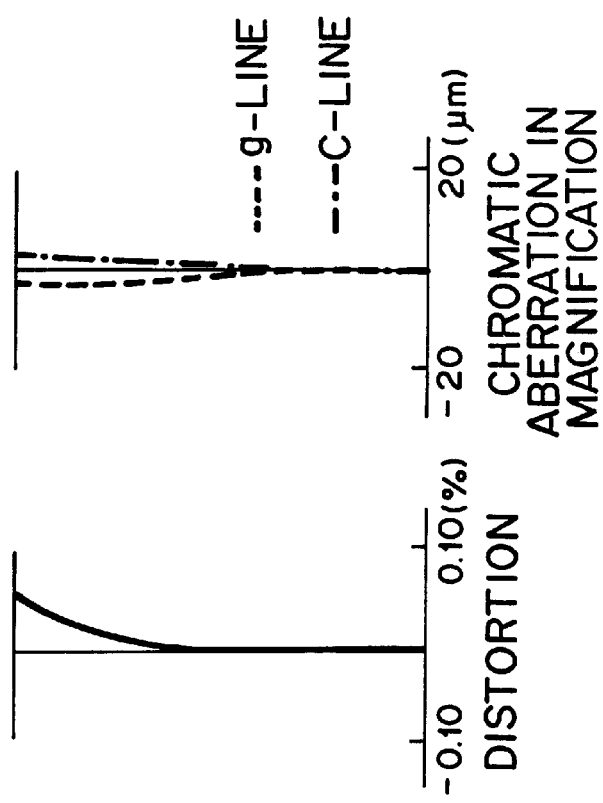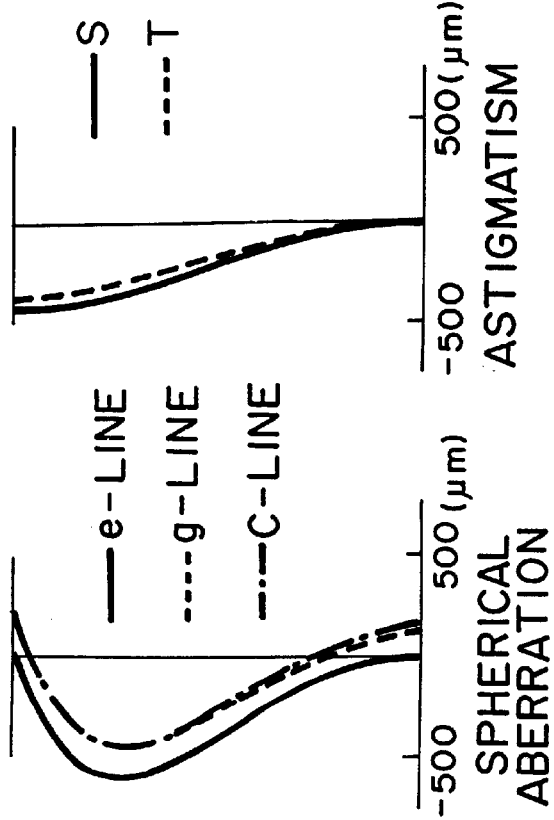

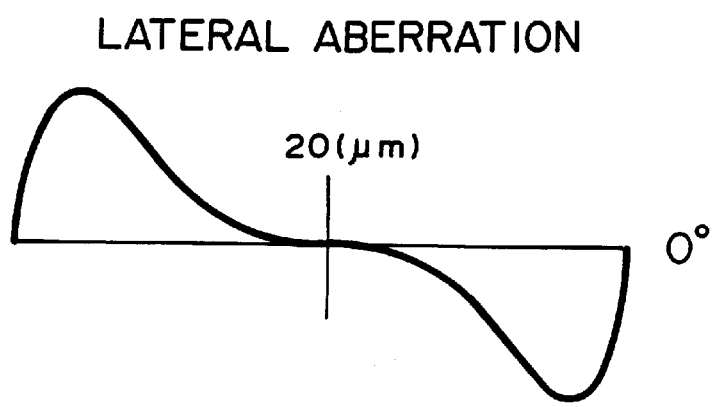
FIG. 11A EXAMPLE 5
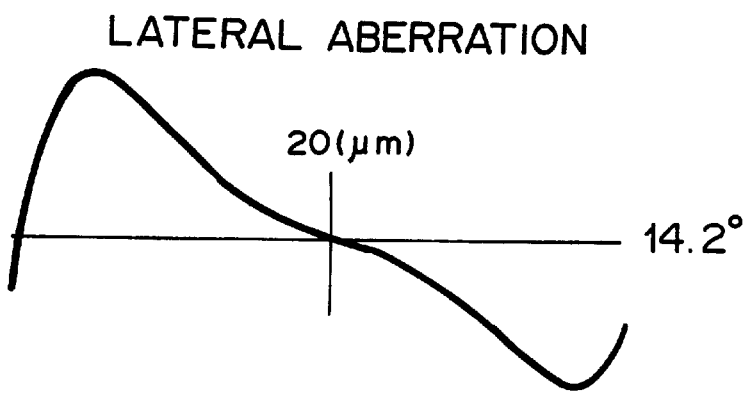
FIG. 11B EXAMPLE 5
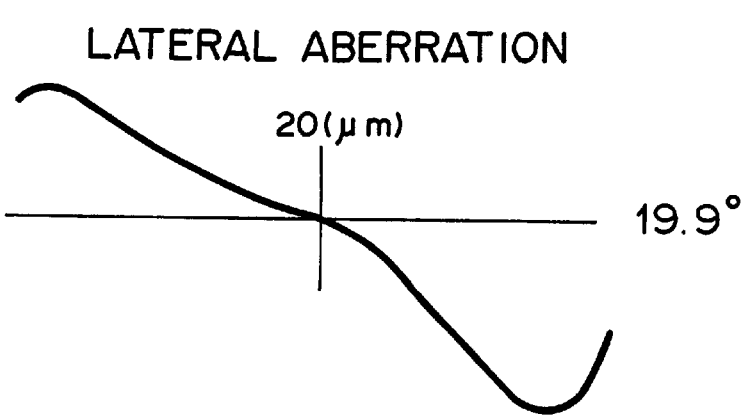
FIG. 11C EXAMPLE 5

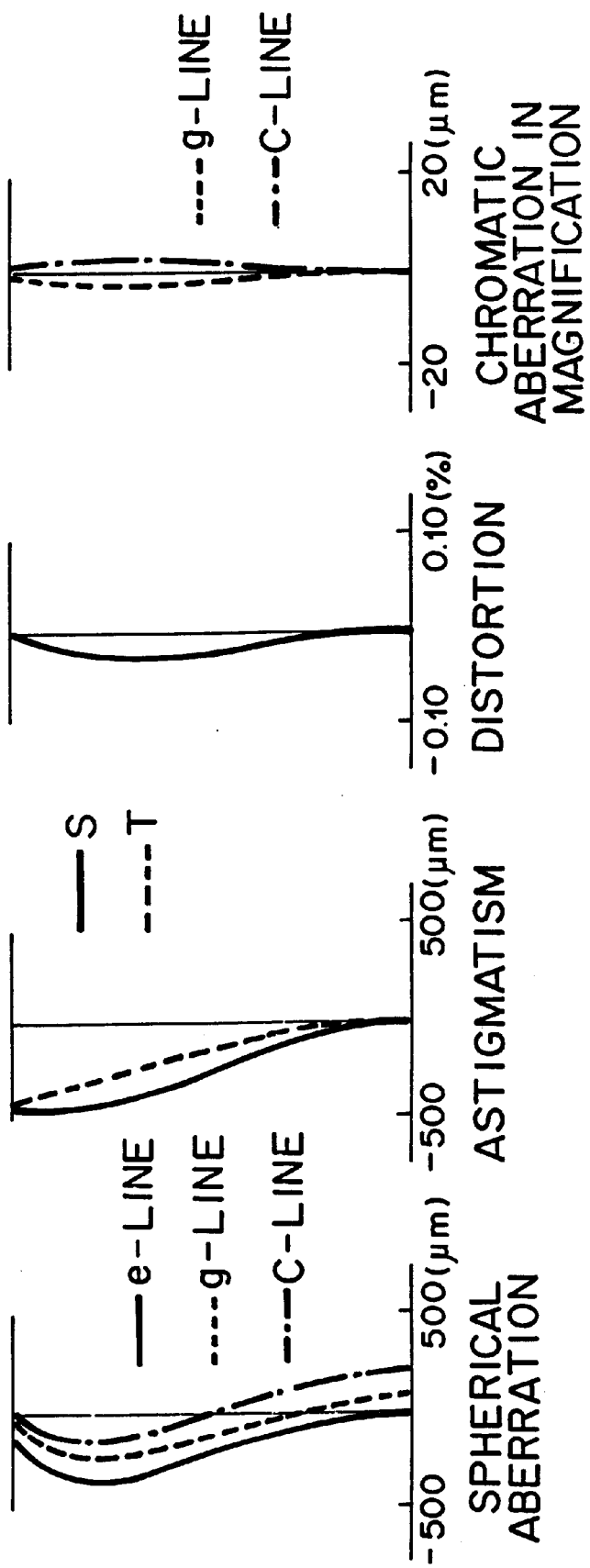

EXAMPLE 6

LATERAL ABERRATION
20(μm)
0°

EXAMPLE 6

LATERAL ABERRATION
20(μm)
15°

EXAMPLE 6

LATERAL ABERRATION
20(μm)
21°

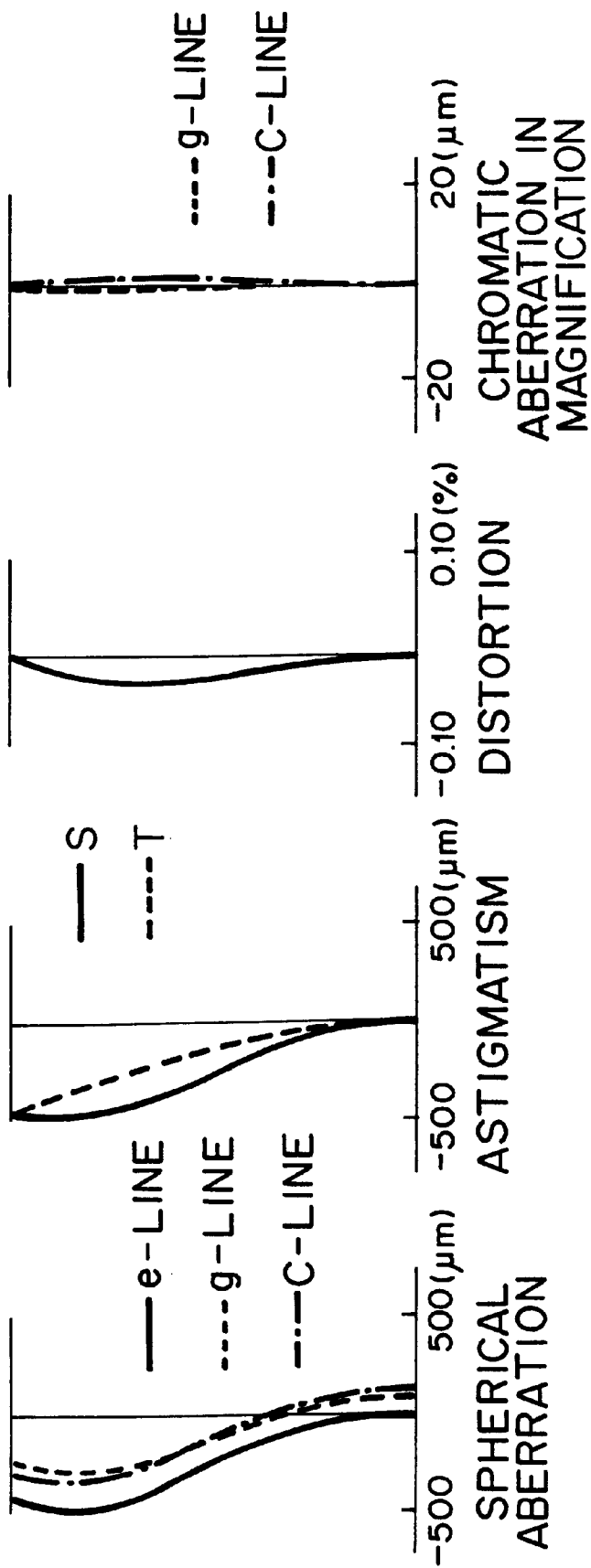

EXAMPLE 7

LATERAL ABERRATION
20(μm)
0°

EXAMPLE 7

LATERAL ABERRATION
20(μm)
15°

EXAMPLE 7

LATERAL ABERRATION
20(μm)
20.9°

IMAGING LENS AND IMAGE READOUT APPARATUS USING THE SAME

RELATED APPLICATIONS

This application claims the priority of Japanese Patent Application No. 11-056568 filed on Mar. 4, 1999, which is incorporated herein by reference.

BACKGROUND OF THE INVENTION

1. Field of the Invention

The present invention relates to an image readout apparatus such as facsimile machine, image scanner, or the like; and an imaging lens for image readout employed in an optical system thereof. In particular, the present invention relates to a four-group, six-element imaging lens in which first and second lenses are cemented to each other, and fifth and sixth lenses are cemented to each other.

2. Description of the Prior Art

Conventionally, a solid-state image sensor made of CCD has been used in general as a photosensitive member disposed in an imaging section of an image readout apparatus such as facsimile machine, scanner, or the like. Recently, as the pixel density in CCD has rapidly been increasing, imaging lenses with a higher resolution have been demanded as those employed in the image readout apparatus.

As an imaging lens which can respond to such a demand, a six-element image readout apparatus disclosed in Japanese Unexamined Patent Publication No. 10-253881 has been known.

In the prior art disclosed in the above-mentioned publication, however, a greater depth is hard to obtain as the resolution of the imaging lens becomes higher, whereby a higher degree of focus adjustment is required in the image readout apparatus.

Also, there has been a fear of the resolution deteriorating due to fluctuations in flatness of an original or due to the flotation thereof.

SUMMARY OF THE INVENTION

In view of such circumstances, it is an object of the present invention to provide a six-element imaging lens which can reduce curvature of field and enhance the depth, thereby alleviating the burden of focus adjustment in an image readout apparatus, and can lower the deterioration in resolution due to fluctuations in flatness of the original or due to the flotation thereof.

It is another object of the present invention to provide an image readout apparatus using such an imaging lens.

In one aspect, the imaging lens in accordance with the present invention comprises, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, the first and second lenses being cemented to each other, the fifth and sixth lenses being cemented to each other, the imaging lens satisfying the following conditional expressions (1) to (5):

$$0.01 < d_6/f < 0.17 \quad (1)$$

$$0.9 < f_3/f < 1.8 \quad (2)$$

$$-0.4 < f/f_{12} < 0.4 \quad (3)$$

$$0.51 < f_{34}/f < 0.72 \quad (4)$$

$$1.15 < v_1/v_2 < 1.65 \quad (5)$$

where
- f is the focal length of the whole system;
- $f_3$ is the focal length of the third lens;
- $f_{12}$ is the composite focal length of the first and second lenses;
- $f_{34}$ is the composite focal length of the third and fourth lenses;
- $d_6$ is the distance between the sixth and seventh surfaces;
- $v_1$ is the Abbe number of a material of the first lens; and
- $v_2$ is the Abbe number of a material of the second lens.

In another aspect, the imaging lens in accordance with the present invention comprises, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, the first and second lenses being cemented to each other, the fifth and sixth lenses being cemented to each other, the second and fifth lenses satisfying the following conditional expression (6):

$$\theta_{g,F} + 0.0019 v_d < 0.650 \quad (6)$$

where
- $\theta_{g,F}$ is a partial dispersion ratio of a lens material expressed by:

$$\theta_{g,F} = (N_g - N_F)/(N_F - N_C)$$

- $v_d$ is an Abbe number of the lens material expressed by:

$$v_d = (N_d - 1)/(N_F - N_C)$$

where
- $N_g$ is the refractive index of the lens material at a wavelength of 435.8 nm;
- $N_F$ is the refractive index of the lens material at a wavelength of 486.1 nm;
- $N_C$ is the refractive index of the lens material at a wavelength of 656.3 nm; and
- $N_d$ is the refractive index of the lens material at a wavelength of 587.6 nm.

In still another aspect, the imaging lens in accordance with the present invention comprises, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, the first and second lenses being cemented to each other, the fifth and sixth lenses being cemented to each other, the first and sixth lenses satisfying the following conditional expression (7):

$$N_d + 0.015 v_d > 2.58 \qquad (7)$$

where $N_d$ is the refractive index of a lens material at d-line; and $v_d$ is the Abbe number of the lens material.

Also, the imaging lens in accordance with the present invention satisfying the above-mentioned conditional expressions (1) to (5) may be configured so as to satisfy at least one of the above-mentioned conditional expression (6) concerning the second and fifth lenses and the above-mentioned conditional expression (7) concerning the first and sixth lenses.

Further, the above-mentioned imaging lens may be configured so as to satisfy the following conditional expression (8):

$$0.05 \leq |\beta| \leq 0.7 \qquad (8)$$

where $\beta$ is the magnification of the whole system.

The image readout apparatus of the present invention is characterized in that it uses any of the above-mentioned imaging lenses.

BRIEF DESCRIPTION OF THE DRAWINGS

FIGS. 2A, 2B, 2C and 2D are aberration charts (showing spherical aberration, astigmatism, distortion, and chromatic aberration in magnification) of the lens in accordance with Example 1;

FIGS. 3A, 3B and 3C are aberration charts (showing lateral aberration) of the lens in accordance with Example 1;

FIGS. 4A, 4B, 4C and 4D are aberration charts (showing spherical aberration, astigmatism, distortion, and chromatic aberration in magnification) of the lens in accordance with Example 2;

FIGS. 6A, 6B, 6C and 6D are aberration charts (showing spherical aberration, astigmatism, distortion, and chromatic aberration in magnification) of the lens in accordance with Example 3;

FIGS. 8A, 8B, 8C and 8D are aberration charts (showing spherical aberration, astigmatism, distortion, and chromatic aberration in magnification) of the lens in accordance with Example 4;

FIGS. 10A, 10B, 10C and 10D are aberration charts (showing spherical aberration, astigmatism, distortion, and chromatic aberration in magnification) of the lens in accordance with Example 5;

FIGS. 11A, 11B and 11C are aberration charts (showing lateral aberration) of the lens in accordance with Example 5;

FIGS. 12A, 12B, 12C and 12D are aberration charts (showing spherical aberration, astigmatism, distortion, and chromatic aberration in magnification) of the lens in accordance with Example 6;

FIGS. 14A, 14B, 14C and 14D are aberration charts (showing spherical aberration, astigmatism, distortion, and chromatic aberration in magnification) of the lens in accordance with Example 7;

DESCRIPTION OF THE PREFERRED EMBODIMENTS

In the following, an embodiment of the imaging lens in accordance with the present invention will be explained with reference to specific examples.

Figure 16:
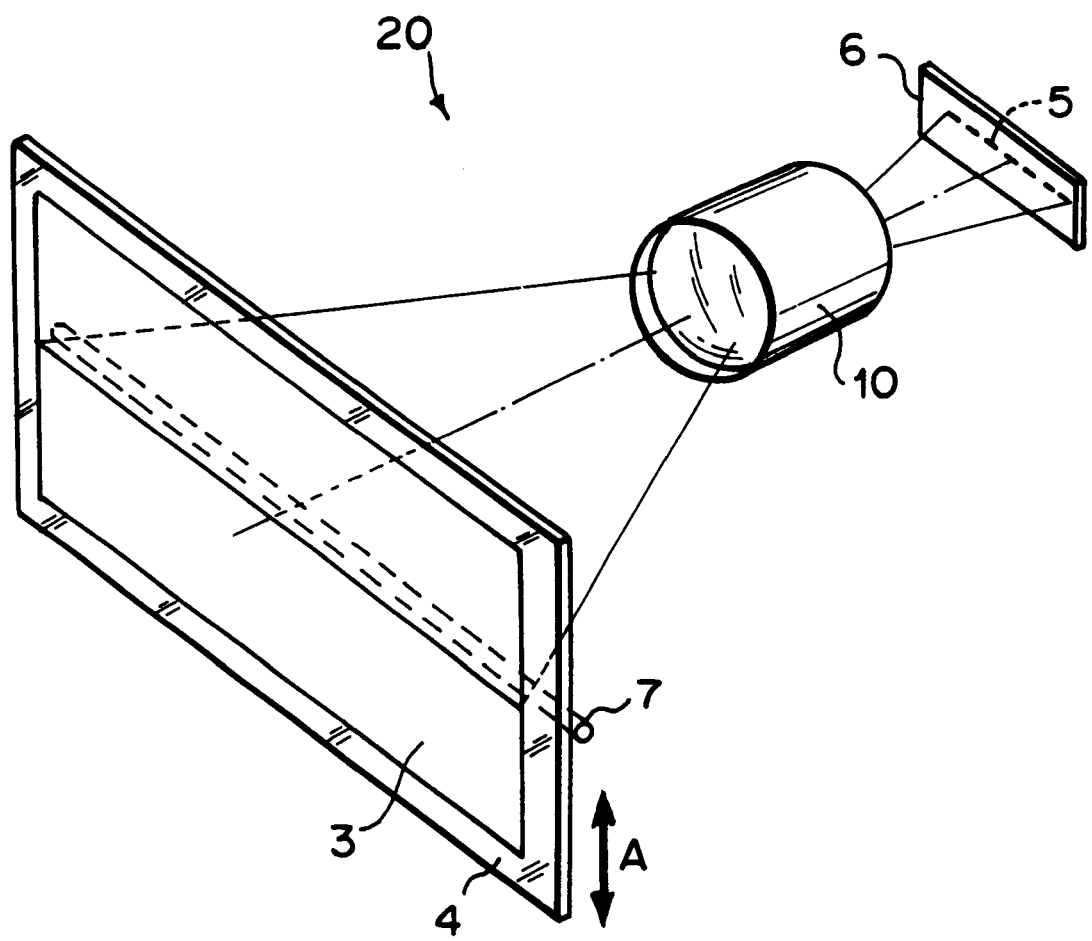
FIG. 16 is a schematic view showing an image readout apparatus in accordance with an embodiment of the present invention.

In this embodiment, as shown in FIG. 16, the imaging lens acts as an image readout lens 10 used in an optical system of an image readout apparatus 20 such as image scanner. In this image readout apparatus 20, the image readout lens 10 is disposed between a glass plate 4 for mounting an original 3 and a CCD cover glass 6 of a linear CCD 5 in which CCDs are arranged in one to several rows, whereas an illuminating device 7 is disposed on the image readout lens 10 side of the glass plate 4.

As the original 3 is moved in directions A perpendicular to the aligning direction of the linear CCD relative to the optical axis of the imaging lens, images on the original 3 are read out.

Figure 1:
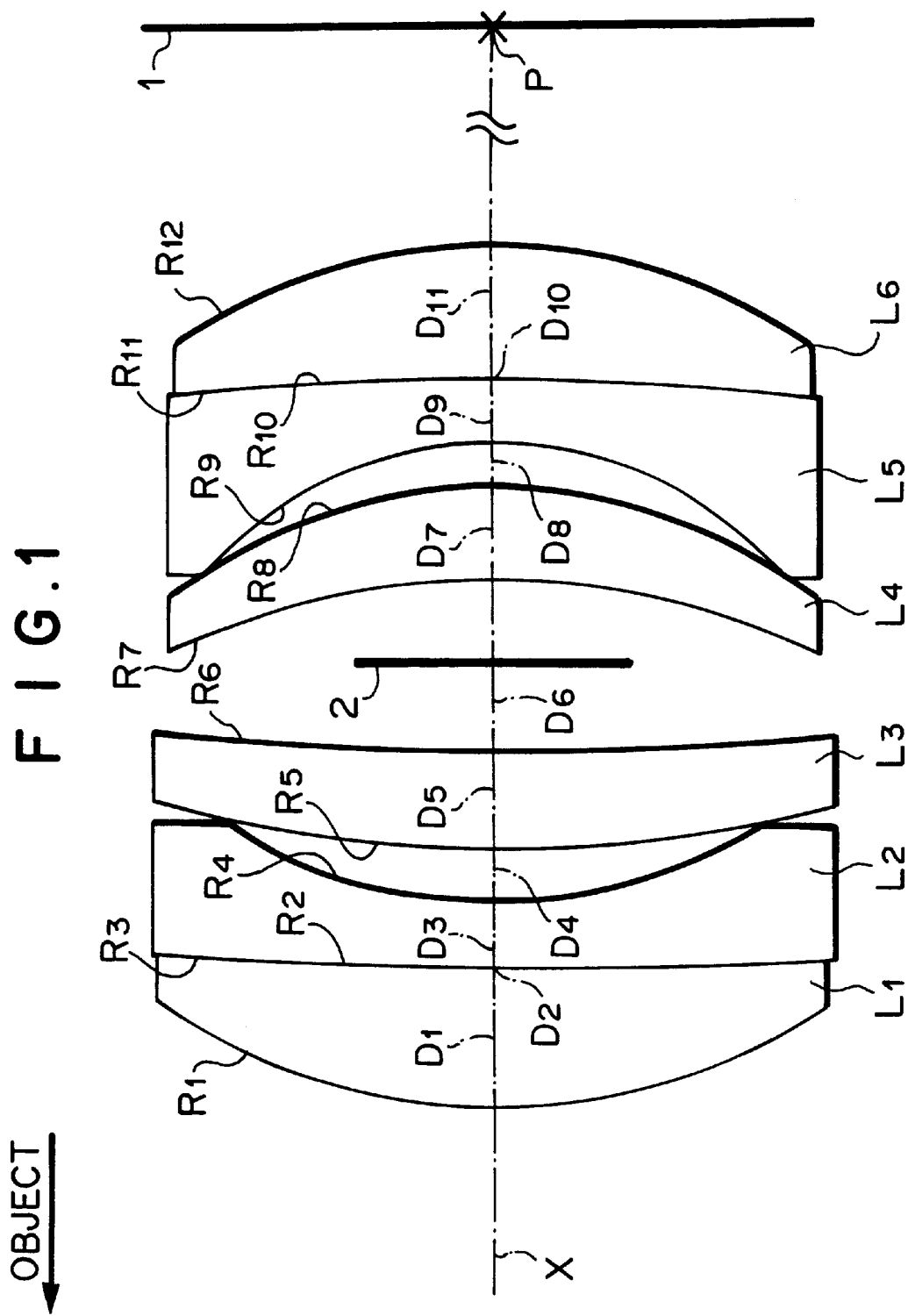
FIG. 1 is a schematic view showing a basic lens configuration in accordance with Examples 1 to 7 of the present invention.
Figure 5A:
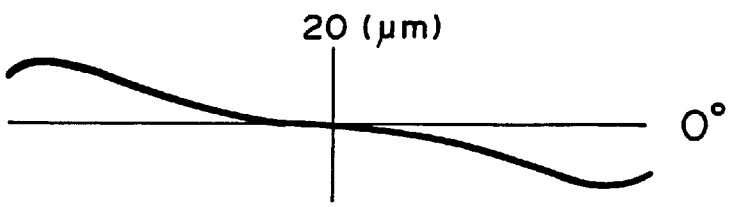
FIGS. 5A, 5B and 5C are aberration charts (showing lateral aberration) of the lens in accordance with Example 2.
Figure 5B:
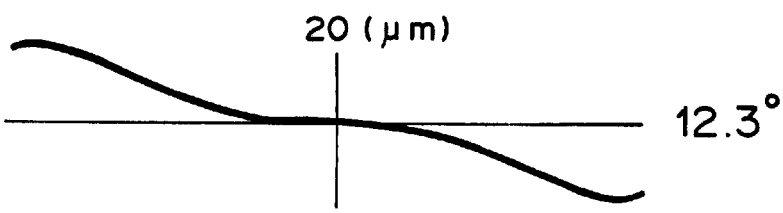
Figure 5C:
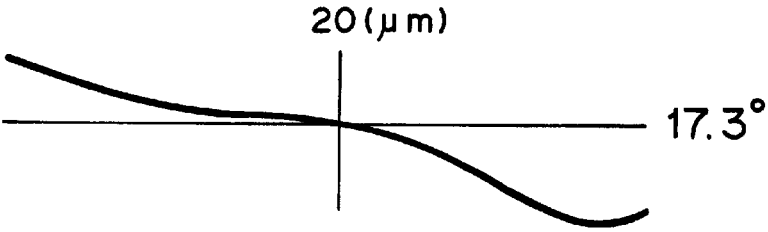
Figure 7A:
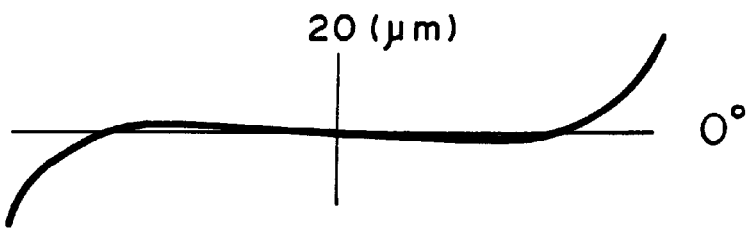
FIGS. 7A, 7B and 7C are aberration charts (showing lateral aberration) of the lens in accordance with Example 3.
Figure 7B:
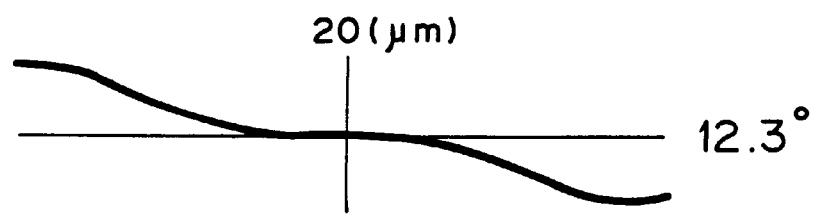
Figure 7C:
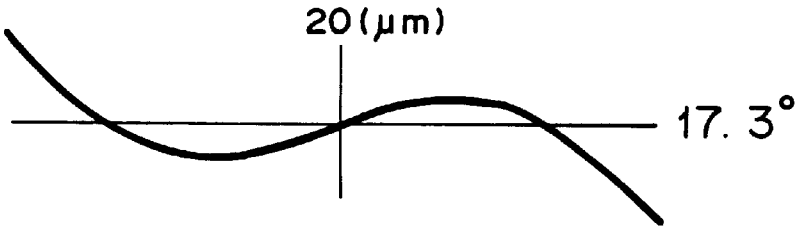
Figure 9A:
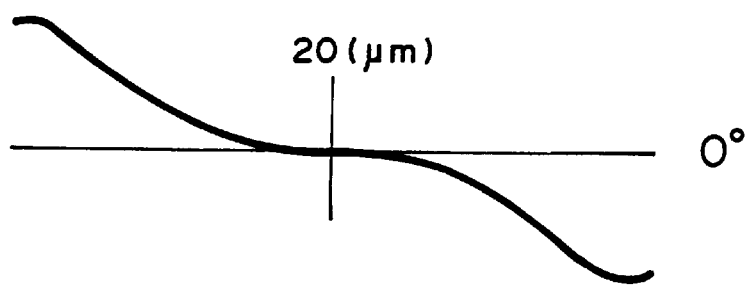
FIGS. 9A, 9B and 9C are aberration charts (showing lateral aberration) of the lens in accordance with Example 4.
Figure 9B:
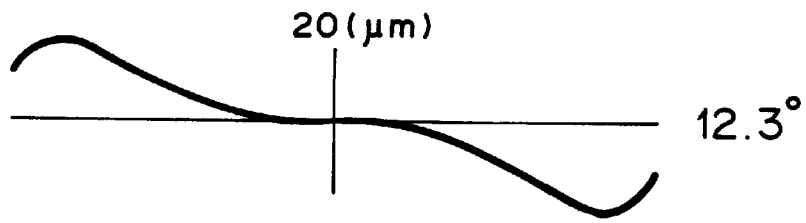
Figure 9C:
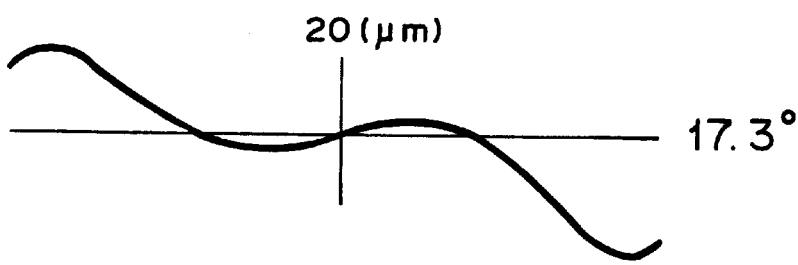
Figure 13A:
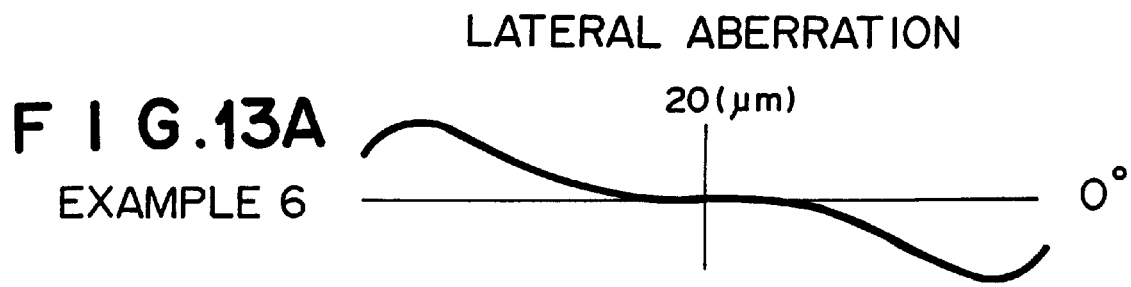
FIGS. 13A, 13B and 13C are aberration charts (showing lateral aberration) of the lens in accordance with Example 6.
Figure 13B:
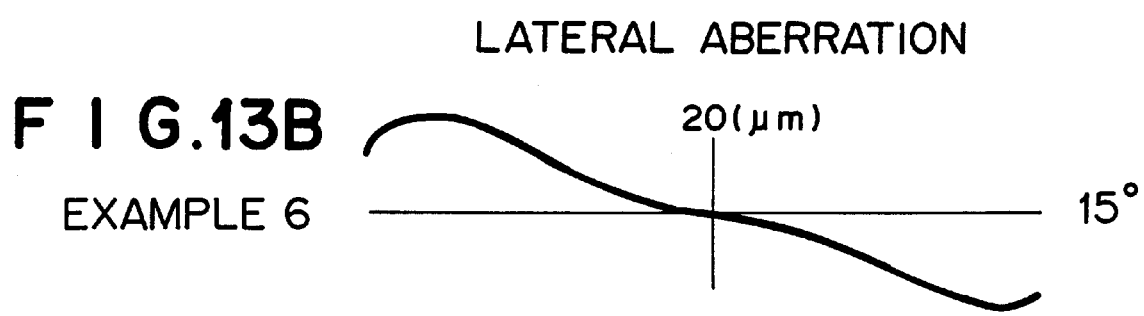
Figure 13C:
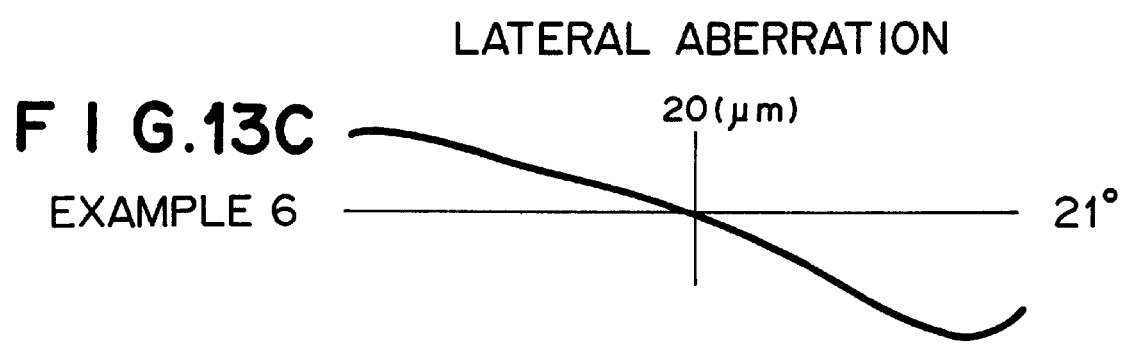
Figure 15A:
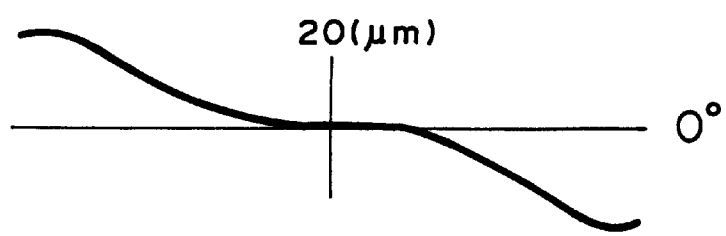
FIGS. 15A, 15B and 15C are aberration charts (showing lateral aberration) of the lens in accordance with Example 7.
Figure 15B:
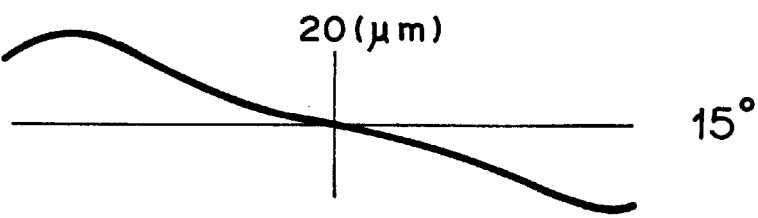
Figure 15C:
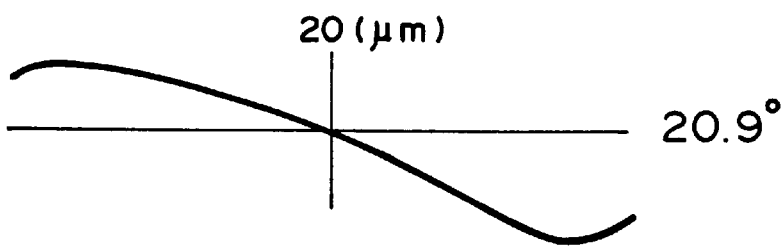

FIG. 1 shows the basic lens configuration of Examples 1 to 7. As shown in FIG. 1, the imaging lens for image readout (image readout lens) in accordance with these examples is a four-group, six-element lens system of ortho-meta type constituted by six lenses $L_1$ to $L_6$, in which the first lens $L_1$ and the second lens $L_2$ are cemented to each other, and the fifth lens $L_5$ and the sixth lens $L_6$ are cemented to each other, whereas a stop 2 is disposed between the third lens $L_3$ and the fourth lens $L_4$, whereby a luminous flux incident along the optical axis X from the object side forms an image at an imaging position P on an imaging surface 1.

Here, the first lens $L_1$ is a positive meniscus lens having a convex surface directed onto the object side, the second lens $L_2$ is a negative meniscus lens having a concave surface directed onto the image side, the third lens $L_3$ is a positive meniscus lens having a convex surface directed onto the object side, the fourth lens $L_4$ is a positive meniscus lens having a convex surface directed onto the image side, the fifth lens $L_5$ is a negative meniscus lens having a concave surface directed onto the object side, and the sixth lens $L_6$ is a positive meniscus lens having a convex surface directed onto the image side.

Also, the image readout lens in accordance with each Example satisfies the following conditional expressions:

$$0.01 < d_6/f < 0.17 \qquad (1)$$

$$0.9 < f_3/f < 1.8 \qquad (2)$$

$$-0.4 < f/f_{12} < 0.4 \qquad (3)$$

$$0.51 < f_{34}/f < 0.72 \qquad (4)$$

$$1.15 < v_1/v_2 < 1.65 \qquad (5)$$

where f is the focal length of the whole system, $f_3$ is the focal length of the third lens, $f_{12}$ is the composite focal length of the first and second lenses, $f_{34}$ is the composite focal length of the third and fourth lenses, $d_6$ is the distance between the sixth and seventh surfaces, $v_1$ is the Abbe number of the glass material of the first lens, and $v_2$ is the Abbe number of the glass material of the second lens;

$$\theta_{g,F}+0.0019v_d<0.650 \quad (6)$$

where $\theta_{g, F}$ is a partial dispersion ratio of a glass material in the second and fifth lenses expressed by:

$$\theta_{g,F}=(N_g-N_F)/(N_F-N_C)$$

$v_d$ is an Abbe number of the glass material in the second and fifth lenses expressed by:

$$v_d=(N_d-1)/(N_F-N_C)$$

where $N_g$ is the refractive index of the lens glass material at a wavelength of 435.8 nm, $N_F$ is the refractive index of the lens glass material at a wavelength of 486.1 nm, $N_C$ is the refractive index of the lens glass material at a wavelength of 656.3 nm, and $N_d$ is the refractive index of the lens glass material at a wavelength of 587.6 nm;

$$N_d+0.015v_d>2.58 \quad (7)$$

where $N_d$ is the refractive index of a glass material in the first and sixth lenses at d-line, and $v_d$ is the Abbe number of the glass material in the first and sixth lenses; and $$0.05 \leq |\beta| \leq 0.7 \quad (8)$$

where $\beta$ is the magnification of the whole system.

Technical significance of each of the above-mentioned conditional expressions (1) to (8) will now be explained.

The above-mentioned conditional expression (1) is one defining the ratio $D_6/f$ of the distance between the sixth surface of the third lens $L_3$ and the seventh surface of the fourth lens $L_4$ to the focal length f of the whole system, in order to yield an appropriate lens arrangement and favorably correct astigmatism, spherical aberration, and curvature of field.

In this conditional expression (1), if the value of $D_6/f$ is less than the lower limit, then the third lens $L_3$ and the fourth lens $L_4$ are so close to each other that an appropriate lens arrangement may not be possible, and astigmatism may increase. If the value of $D_6/f$ exceeds the upper limit, by contrast, then astigmatism and curvature of field enhance, and spherical aberration is corrected in excess, whereby a homogenous image may not be obtained in the whole image area. Also, the lens becomes greater in size, thereby raising its cost.

The above-mentioned conditional expression (2) is one defining the ratio $f_3/f$ of the focal length $f_3$ of the third lens $L_3$ to the focal length f of the whole system, in order to favorably correct distortion and chromatic aberration in magnification.

In this conditional expression (2), if the value of $f_3/f$ is less than the lower limit or greater than the upper limit, then distortion and chromatic aberration in magnification may enhance beyond a practical range as the imaging lens.

The above-mentioned conditional expression (3) is one defining the ratio $f/f_{12}$ of the focal length f of the whole system to the composite focal length $f_{12}$ of the first lens $L_1$ and the second lens $L_2$, in order to favorably correct astigmatism, spherical aberration, and curvature of field.

In this conditional expression (3), if the value of $f/f_{12}$ is less than the lower limit, then astigmatism increases, and spherical aberration is corrected in excess. If the value of $f/f_{12}$ exceeds the upper limit, by contrast, then curvature of field enhances, and it becomes harder to keep astigmatism appropriately.

The above-mentioned conditional expression (4) is one defining the ratio $f_{34}/f$ of the composite focal length $f_{34}$ of the third lens $L_3$ and fourth lens $L_4$ to the focal length f of the whole system, in order to favorably correct spherical aberration and curvature of field.

In this conditional expression (4), if the value of $f_{34}/f$ is less than the lower limit, then curvature of field becomes greater. If the value of $f_{34}/f$ exceeds the upper limit, by contrast, then astigmatism becomes greater, whereby a homogenous image may not be obtained in the whole image area.

The above-mentioned conditional expression (5) is one defining the ratio $v_1/v_2$ of the Abbe number $v_1$ of the glass material of the first lens $L_1$ to the Abbe number $v_2$ of the glass material of the second lens $L_2$, in order to favorably correct axial chromatic aberration.

In this conditional expression (5), if the value of $v_1/v_2$ is less than the lower limit, then axial chromatic aberration is corrected insufficiently. If the value of $v_1/v_2$ exceeds the upper limit, by contrast, then axial chromatic aberration is corrected in excess. In any case, the focal positions of three colors of blue, green, and red are harder to match a practical range.

The above-mentioned conditional expression (6) is one defining a range of a predetermined value of addition $\theta_{g,F}+0.0019v_d$ of the partial dispersion ratio $\theta_{g,F}$ of the glass material in each of the second lens $L_2$ and fifth lens $L_5$ and the Abbe number $v_d$ of the glass material of each lens, in order to favorably correct axial chromatic aberration.

In this conditional expression (6), if the value of $\theta_{g,F}+0.0019v_d$ lies within the defined range, then axial chromatic aberration can be corrected to a high degree, so that the focal positions of three colors of blue, green, and red can be made very close to each other, whereby images can be read out with a high resolution.

The above-mentioned conditional expression (7) is one defining a range of a predetermined value of addition $N_d+0.015v_d$ of the refractive index $N_d$ at d-line and Abbe number $v_d$ of the glass material in each of the first lens $L_1$ and sixth lens $L_6$, in order to favorably correct axial chromatic aberration.

In this conditional expression (7), if the value of $N_d+0.015v_d$ lies within the defined range, axial chromatic aberration can be corrected to a high degree, so that the focal positions of three colors of blue, green, and red can be made very close to each other, whereby images can be read out with a high resolution.

The above-mentioned conditional expression (8) is one for defining the absolute value of magnification of the whole system.

In the case where the image readout lens in accordance with the present invention is used for color image readout in particular, the effects of correcting the individual aberrations mentioned above become more remarkable if a glass material satisfying the above-mentioned conditional expression (6) is employed in the second lens $L_2$ and the fifth lens $L_5$ or a glass material satisfying the above-mentioned conditional expression (7) is employed in the first lens $L_1$ and the sixth lens $L_6$.

Each of Examples 1 to 7 will now be explained with reference to specific values.

EXAMPLE 1

The upper part of the following Table 1 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 1.

In Table 1 and Tables 2 to 7 which will be mentioned later, numbers referring to each of the letters R, D, $N_d$, and $v_d$ successively increase from the object side.

The middle part of Table 1 shows values of focal length f, F-number, half angle of view ω, and magnification β of the whole lens system in Example 1.

The lower part of Table 1 shows the respective values corresponding to the above-mentioned conditional expressions (1) to (4), (6), and (7) in Example 1.

As can be seen from Table 1, Example 1 satisfies the above-mentioned conditional expressions (1) to (4), (6), and (7), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 42.7 mm in the image readout lens of Example 1, then an object extending over the shorter side of an A4-size sheet can be read out.

EXAMPLE 2

The upper part of the following Table 2 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 2.

The middle part of Table 2 shows values of focal length f, F-number, half angle of view ω, and magnification β of the whole lens system in Example 2.

The lower part of Table 2 shows the respective values corresponding to the above-mentioned conditional expressions (1) to (7) in Example 2.

As can be seen from Table 2, Example 2 satisfies the above-mentioned conditional expressions (1) to (7), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 80 mm in the image readout lens of Example 2, then an object extending over the shorter side of an A3-size sheet can be read out.

EXAMPLE 3

The upper part of the following Table 3 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 3.

The middle part of Table 3 shows values of focal length f, F-number, half angle of view ω, and magnification β of the whole lens system in Example 3.

The lower part of Table 3 shows the respective values corresponding to the above-mentioned conditional expressions (1) to (7) in Example 3.

As can be seen from Table 3, Example 3 satisfies the above-mentioned conditional expressions (1) to (7), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 80 mm in the image readout lens of Example 3, then an object extending over the shorter side of an A3-size sheet can be read out.

EXAMPLE 4

The upper part of the following Table 4 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 4.

The middle part of Table 4 shows values of focal length f, F-number, half angle of view ω, and magnification β of the whole lens system in Example 4.

The lower part of Table 4 shows the respective values corresponding to the above-mentioned conditional expressions (1) to (7) in Example 4.

As can be seen from Table 4, Example 4 satisfies the above-mentioned conditional expressions (1) to (7), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 80 mm in the image readout lens of Example 4, then an object extending over the shorter side of an A3-size sheet can be read out.

EXAMPLE 5

The upper part of the following Table 5 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 5.

The middle part of Table 5 shows values of focal length f, F-number, half angle of view ω, and magnification β of the whole lens system in Example 5.

The lower part of Table 5 shows the respective values corresponding to the above-mentioned conditional expressions (1) to (7) in Example 5.

As can be seen from Table 5, Example 5 satisfies the above-mentioned conditional expressions (1) to (7), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 80 mm in the image readout lens of Example 5, then an object extending over the shorter side of an A3-size sheet can be read out.

Also, the glass material of each of the first lens $L_1$ to the sixth lens $L_6$ in the image readout lens of Example 5 includes no lead (Pb).

EXAMPLE 6

The upper part of the following Table 6 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 6.

The middle part of Table 6 shows values of focal length f, F-number, half angle of view ω, and magnification β of the whole lens system in Example 6.

The lower part of Table 6 shows the respective values corresponding to the above-mentioned conditional expressions (1) to (6) in Example 6.

Here, in the second and fifth lenses, $N_g$=1.63107, $N_F$=1.62319, and $N_C$=1.60920.

As can be seen from Table 6, Example 6 satisfies the above-mentioned conditional expressions (1) to (6), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 80 mm in the image readout lens of Example 6, then an object extending over the shorter side of an A4-size sheet can be read out.

EXAMPLE 7

The upper part of the following Table 7 shows the radius of curvature R (mm) of each lens surface, center thickness of each lens and air space between each pair of neighboring lenses D (mm), refractive index $N_d$ of each lens at d-line, Abbe number $v_d$ of each lens, and glass material name of each lens in Example 7.

The middle part of Table 7 shows values of focal length f, F-number, half angle of view ω, and magnification β of the whole lens system in Example 7.

The lower part of Table 7 shows the respective values corresponding to the above-mentioned conditional expressions (1) to (5) and (7) in Example 7.

As can be seen from Table 7, Example 7 satisfies the above-mentioned conditional expressions (1) to (5) and (7), so that spherical aberration, curvature of field, astigmatism, distortion, chromatic aberration in magnification, and axial chromatic aberration are corrected sufficiently, whereby images can be read out with a high resolution.

If the focal length of the whole lens system is set to about 80 mm in the image readout lens of Example 7, then an object extending over the shorter side of an A4-size sheet can be read out.

Also, the glass material of each of the first lens $L_1$ to the sixth lens $L_6$ in the image readout lens of Example 7 includes no lead (Pb).

FIGS. 2 to 15 shows aberration charts (for spherical aberration, astigmatism, distortion, chromatic aberration in magnification, and lateral aberration) corresponding to Examples 1 to 7. Here, each chart of spherical aberration shows aberrations with respect to e-line, g-line, and C-line, whereas each chart of chromatic aberration in magnification shows aberrations with respect to g-line and C-line. Also, each aberration chart of astigmatism shows aberrations with respect to sagittal (S) image surface and tangential (T) image surface at each wavelength.

Here, each aberration chart of Example 1 is obtained in the state where a glass plate having a thickness of 1.281 mm is contained between the object surface and the lens, whereas a glass plate having a thickness of 0.299 mm is contained between the lens and the image surface. Each aberration chart of Examples 2 to 4, 6, and 7 is obtained in the state where a glass plate having a thickness of 2.4 mm is contained between the object surface and the lens, whereas a glass plate having a thickness of 0.64 mm is contained between the lens and the image surface. Each aberration chart of Example 5 is obtained in the state where a glass plate having a thickness of 2.43 mm is contained between the object surface and the lens, whereas a glass plate having a thickness of 0.648 mm is contained between the lens and the image surface.

As can be seen from FIGS. 2 to 15, all the above-mentioned aberrations can be made favorable in accordance with each of the above-mentioned Examples.

Though the first lens $L_1$ and the second lens $L_2$ are cemented to each other, and the fifth lens $L_5$ and the sixth lens $L_6$ are cemented to each other in each of the above-mentioned Examples, similar performances can also be obtained when the first lens $L_1$ and the second lens $L_2$ are independent from each other without being cemented, and the fifth lens $L_5$ and the sixth lens $L_6$ are independent from each other without being cemented.

Though specific values are mentioned in each of the above-mentioned Examples, the absolute value of the magnification of the whole lens system, may be a value other than those mentioned above, and can appropriately be set within the range of $0.05 \leq |\beta| \leq 0.7$. For example, any value of $|\beta|$=0.7, $|\beta|$=0.6, $|\beta|$=0.5, $|\beta|$=0.1, $|\beta|$=0.05, and the like may be employed. Among these values, a range of $0.09 \leq |\beta| \leq 0.4$ can be mentioned as one often employed in such a kind of imaging lens in general.

Without being restricted to those of the above-mentioned embodiment, the image readout lens of the present invention can be modified in various manners. For example, the radius of curvature R and lens space (or lens thickness) D of each lens can be changed as appropriate.

While various image readout apparatus, such as facsimile machine and color scanner, mounted with the image readout lens of this embodiment are used for reading out images from the original, the quality of the read-out images becomes favorable at this time.

As explained in the foregoing, since the imaging lens of the present invention has a four-group, six-element configuration as a whole and satisfies the above-mentioned predetermined conditional expressions, it can favorably correct various aberrations, and can lower the curvature of field so as to enhance depth in particular.

Therefore, the burden of focus adjustment in the image readout apparatus can be alleviated, and the deterioration in resolution due to fluctuations in flatness of the original or due to the flotation thereof decreases.

Also, the image readout apparatus using the image readout lens of the present invention can yield a favorable image quality at the time of image readout.

TABLE 1

| Surface | R | D | $N_d$ | $v_d$ | Glass material name |
|---|---|---|---|---|---|
| 1 | 27.667 | 8.15 | 1.65844 | 50.8 | SSK-5 (SUMITA) |
| 2 | 2173.443 | 0.0 | | | |
| 3 | 2173.443 | 2.857 | 1.59551 | 39.2 | F-8 (SUMITA) |
| 4 | 23.555 | 2.178 | | | |
| 5 | 71.136 | 4.707 | 1.63854 | 55.5 | SK-18 (SUMITA) |
| 6 | 229.063 | 8.431 | | | |
| 7 | −33.162 | 5.222 | 1.63854 | 55.5 | SK-18 (SUMITA) |
| 8 | −22.556 | 1.827 | | | |
| 9 | −16.855 | 2.763 | 1.59551 | 39.2 | F-8 (SUMITA) |
| 10 | −180.225 | 0.0 | | | |
| 11 | −180.225 | 7.845 | 1.65844 | 50.8 | SSK-5 (SUMITA) |
| 12 | −25.101 | | | | | f = 100 mm, F/6.0, ω = 19.7°, β = −0.1654
(1) $d_6/f = 0.0843$
(2) $f_3/f = 1.590$
(3) $f/f_{12} = 0.252$
(4) $f_{34}/f = 0.638$

TABLE 2

| Surface | R | D | $N_d$ | $v_d$ | Glass material name |
|---|---|---|---|---|---|
| 1 | 26.282 | 7.179 | 1.65844 | 50.8 | SSK-5(SUMITA) |
| 2 | 2572.07 | 0.0 | | | |
| 3 | 2572.07 | 3.121 | 1.59551 | 39.2 | F-8(SUMITA) |
| 4 | 22.459 | 2.429 | | | |
| 5 | 63.613 | 4.994 | 1.63854 | 55.5 | SK-18(SUMITA) |
| 6 | 180.559 | 7.491 | | | |
| 7 | −31.707 | 5.281 | 1.63854 | 55.5 | SK-18(SUMITA) |
| 8 | −22.169 | 2.141 | | | |
| 9 | −16.457 | 3.121 | 1.59551 | 39.2 | F-8(SUMITA) |
| 10 | −141.948 | 0.0 | | | |
| 11 | −141.948 | 7.491 | 1.65844 | 50.8 | SSK-5(SUMITA) |
| 12 | −24.654 | | | | | f = 100 mm, F/6.3, ω = 17.3°, β = −0.189
(1) $d_6/f = 0.0749$
(2) $f_3/f = 1.506$
(3) $f/f_{12} = 0.268$
(4) $f_{34}/f = 0.635$
(5) $v_1/v_2 = 1.3$

TABLE 3

| Surface | R | D | $N_d$ | $v_d$ | Glass material name |
|---|---|---|---|---|---|
| 1 | 23.232 | 6.11 | 1.65844 | 50.8 | SSK-5 (SUMITA) |
| 2 | 101.079 | 0.0 | | | |
| 3 | 101.079 | 3.101 | 1.59551 | 39.2 | F-8 (SUMITA) |
| 4 | 17.209 | 2.112 | | | |
| 5 | 25.564 | 3.345 | 1.63854 | 55.5 | SK-18 (SUMITA) |
| 6 | 37.146 | 14.888 | | | |
| 7 | −47.324 | 3.266 | 1.63854 | 55.5 | SK-18 (SUMITA) |
| 8 | −27.756 | 1.74 | | | |
| 9 | −17.528 | 3.101 | 1.59551 | 39.2 | F-8 (SUMITA) |
| 10 | −116.615 | 0.0 | | | |
| 11 | −116.615 | 6.019 | 1.65844 | 50.8 | SSK-5 (SUMITA) |
| 12 | −23.603 | | | | | f = 100 mm, F/6.3, ω = 17.2°, β = −0.189
(1) $d_6/f = 0.1489$
(2) $f_3/f = 1.149$
(3) $f/f_{12} = −0.136$
(4) $f_{34}/f = 0.601$
(5) $v_1/v_2 = 1.3$

TABLE 4

| Surface | R | D | $N_d$ | $v_d$ | Glass material name |
|---|---|---|---|---|---|
| 1 | 25.49 | 6.276 | 1.65844 | 50.8 | SSK-5 (SUMITA) |
| 2 | 69.586 | 0.0 | | | |

TABLE 4-continued

| Surface | R | D | $N_d$ | $v_d$ | Glass material name |
|---|---|---|---|---|---|
| 3 | 69.586 | 3.138 | 1.59551 | 39.2 | F-8 (SUMITA) |
| 4 | 18.002 | 2.509 | | | |
| 5 | 24.527 | 3.166 | 1.63854 | 55.5 | SK-18 (SUMITA) |
| 6 | 36.4 | 1.255 | | | |
| 7 | −42.687 | 3.14 | 1.63854 | 55.5 | SK-18 (SUMITA) |
| 8 | −27.37 | 2.509 | | | |
| 9 | −18.083 | 2.261 | 1.59551 | 39.2 | F-8 (SUMITA) |
| 10 | −177.366 | 0.0 | | | |
| 11 | −177.366 | 5.659 | 1.65844 | 50.8 | SSK-5 (SUMITA) |
| 12 | −23.211 | | | | | f = 100 mm, F/6.3, ω = 17.3°, β = −0.189
(1) $d_6/f = 0.126$
(2) $f_3/f = 1.062$
(3) $f/f_{12} = −0.323$
(4) $f_{34}/f = 0.571$
(5) $v_1/v_2 = 1.3$

TABLE 5

| Surface | R | D | $N_d$ | $v_d$ | Glass material name |
|---|---|---|---|---|---|
| 1 | 25.586 | 7.512 | 1.65844 | 50.9 | S-BSM25 (OHARA) |
| 2 | 231.065 | 0.0 | | | |
| 3 | 231.065 | 1.841 | 1.59551 | 39.2 | S-TIM8 (OHARA) |
| 4 | 21.401 | 2.91 | | | |
| 5 | 57.402 | 5.387 | 1.63854 | 55.4 | S-BSM18 (OHARA) |
| 6 | 130.445 | 7.822 | | | |
| 7 | −31.474 | 3.978 | 1.63854 | 55.4 | S-BSM18 (OHARA) |
| 8 | −21.936 | 1.734 | | | |
| 9 | −16.342 | 2.099 | 1.59551 | 39.2 | S-TIM8 (OHARA) |
| 10 | −114.086 | 0.0 | | | |
| 11 | −114.086 | 7.002 | 1.65844 | 50.9 | S-BSM25 (OHARA) |
| 12 | −23.253 | | | | | f = 100 mm, F/5.0, ω = 19.9°, β = −0.2362
(1) $d_6/f = 0.0782$
(2) $f_3/f = 1.554$
(3) $f/f_{12} = 0.172$
(4) $f_{34}/f = 0.65$
(5) $v_1/v_2 = 1.3$

TABLE 6

| Surface | R | D | $N_d$ | $v_d$ | Glass material name |
|---|---|---|---|---|---|
| 1 | 24.876 | 7.535 | 1.62041 | 60.3 | SK-16 (SUMITA) |
| 2 | 286.9 | 0.0 | | | |
| 3 | 286.9 | 2.009 | 1.6134 | 43.8 | KZFS-4 (SUMITA) |
| 4 | 22.401 | 2.135 | | | |
| 5 | 68.714 | 4.785 | 1.7725 | 49.6 | LASF-N7 (SUMITA) |
| 6 | 194.535 | 9.419 | | | |
| 7 | −32.327 | 4.785 | 1.7725 | 49.6 | LASF-N7 (SUMITA) |
| 8 | −23.519 | 2.135 | | | |
| 9 | −15.978 | 2.009 | 1.6134 | 43.8 | KZFS-4 (SUMITA) |
| 10 | −171.741 | 0.0 | | | |
| 11 | −171.741 | 7.535 | 1.62041 | 60.3 | SK-16 (SUMITA) |
| 12 | −22.013 | | | | | f = 100 mm, F/6.3, ω = 21.0°, β = −0.378
(1) $d_6/f = 0.0942$
(2) $f_3/f = 1.353$
(3) $f/f_{12} = 0.156$
(4) $f_{34}/f = 0.599$
(5) $v_1/v_2 = 1.38$
(6) $\theta_{g,F} + 0.0019\, v_d = 0.646$

TABLE 7

| Surface | R | D | $N_d$ | $v_d$ | Glass material name |
|---|---|---|---|---|---|
| 1 | 25.548 | 7.646 | 1.5924 | 68.3 | GFK-68 (SUMITA) |
| 2 | 128.742 | 0.0 | | | |

TABLE 7-continued

| Surface | R | D | $N_d$ | $v_d$ | Glass material name |
|---|---|---|---|---|---|
| 3 | 128.742 | 3.134 | 1.54814 | 45.8 | S-TIL1 (OHARA) |
| 4 | 22.394 | 2.131 | | | |
| 5 | 71.254 | 4.801 | 1.713 | 53.9 | LAK-8 (SUMITA) |
| 6 | 209.833 | 9.15 | | | |
| 7 | −32.109 | 4.801 | 1.713 | 53.9 | LAK-8 (SUMITA) |
| 8 | −23.403 | 2.131 | | | |
| 9 | −16.154 | 3.134 | 1.54814 | 45.8 | S-TIL1 (OHARA) |
| 10 | −93.621 | 0.0 | | | |
| 11 | −93.621 | 7.646 | 1.5924 | 68.3 | GFK-68 (SUMITA) |
| 12 | −23.221 | | | | | f = 100 mm, F/6.3, β = 20.9°, β = −0.378
(1) $d_6/f$ = 0.0915
(2) $f_3/f$ = 1.492
(3) $f/f_{12}$ = 0.226
(4) $f_{34}/f$ = 0.65
(5) $v_1/v_2$ = 1.49
(7) $N_d + 0.015 v_d$ = 2.617

What is claimed is:

1. An imaging lens comprising, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, said first and second lenses being cemented to each other, said fifth and sixth lenses being cemented to each other, said second and fifth lenses satisfying the following conditional expression (6):

$$\theta_{g,F} + 0.0019 v_d < 0.650 \qquad (6)$$

where $\theta_{g,F}$ is a partial dispersion ratio of a lens material expressed by:

$$\theta_{g,F} = (N_g - N_F)/(N_F - N_C)$$

$v_d$ is an Abbe number of the lens material expressed by:

$$v_d = (N_d - 1)/(N_F - N_C)$$

where $N_g$ is the refractive index of the lens material at a wavelength of 435.8 nm;

$N_F$ is the refractive index of the lens material at a wavelength of 486.1 nm;

$N_C$ is the refractive index of the lens material at a wavelength of 656.3 nm; and $N_d$ is the refractive index of the lens material at a wavelength of 587.6 nm.

2. An imaging lens according to claim 1, wherein said imaging lens satisfies the following conditional expression (8):

$$0.05 \leq |\beta| \leq 0.7 \qquad (8)$$

where

β is the magnification of the whole system.

3. An image readout apparatus using the imaging lens according to claim 1.

4. An imaging lens comprising, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, said first and second lenses being cemented to each other, said fifth and sixth lenses being cemented to each other, said first and sixth lenses satisfying the following conditional expression (7):

$$N_d + 0.015 v_d > 2.58 \qquad (7)$$

where $N_d$ is the refractive index of a lens material at d-line; and $v_d$ is the Abbe number of the lens material.

5. An imaging lens according to claim 4, wherein said imaging lens satisfies the following conditional expression (8):

$$0.05 \leq |\beta| \leq 0.7 \qquad (8):$$

where

β is the magnification of the whole system.

6. An imaging readout apparatus using the imaging lens according to claim 4.

7. An imaging lens comprising, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, said first and second lenses being cemented to each other, said fifth and sixth lenses being cemented to each other, said imaging lens satisfying the following conditional expressions (1) to (5):

$$0.01 < d_6/f < 0.17 \qquad (1)$$

$$0.9 < f_3/f < 1.8 \qquad (2)$$

$$-0.4 < f/f_{12} < 0.4 \qquad (3)$$

$$0.51 < f_{34}/f < 0.72 \qquad (4)$$

$$1.15 < v_1/v_2 < 1.65 \qquad (5)$$

where f is the focal length of the whole system;

$f_3$ is the focal length of the third lens;

$f_{12}$ is the composite focal length of the first and second lenses;

$f_{34}$ is the composite focal length of the third and fourth lenses;

$d_6$ is the distance between the sixth and seventh surfaces;

$v_1$ is the Abbe number of a material of the first lens; and $v_2$ is the Abbe number of a material of the second lens, wherein said imaging lens satisfies at least one of the following conditional expression (6) concerning said second and fifth lenses and the following conditional expression (7) concerning said first and sixth lenses:

$$\theta_{g,F} + 0.0019 v_d < 0.650 \qquad (6)$$

where $\theta_{g,F}$ is a partial dispersion ratio of a lens material expressed by:

$$\theta_{g,F}=(N_g-N_F)/(N_F-N_C) \quad (5)$$

$v_d$ is an Abbe number of the lens material expressed by:

$$v_d=(N_d-1)/(\mathrm{i}\ N_F-N_C)$$

where $N_g$ is the refractive index of the lens material at a wavelength of 435.8 nm, $N_F$ is the refractive index of the lens material at a wavelength of 486.1 nm, $N_C$ is the refractive index of the lens material at a wavelength of 656.3 nm, and $N_d$ is the refractive index of the lens material at a wavelength of 587.6 nm;

$$N_d+0.015v_d>2.58 \quad (7)$$

where $N_d$ is the refractive index of a lens material at a d-line, and $v_d$ is the Abbe number of the lens material.

8. An image readout apparatus using the imaging lens according to claim 7.

9. An imaging lens comprising, successively from an object side, a positive first lens having a convex surface directed onto the object side, a negative second lens having a concave surface directed onto an image side, a third lens made of a positive meniscus lens having a convex surface directed onto the object side, a fourth lens made of a positive meniscus lens having a convex surface directed onto the image side, a negative fifth lens having a concave surface directed onto the object side, and a positive sixth lens having a convex surface directed onto the image side, said first and second lenses being cemented to each other, said fifth and sixth lenses being cemented to each other, said imaging lens satisfying the following conditional expressions (1) to (5):

$$0.01<d_6/f<0.17 \quad (1)$$

$$0.9<f_3/f<1.8 \quad (2)$$

$$-0.4<f/f_{12}<0.4 \quad (3)$$

$$0.51<f_{34}/f<0.72 \quad (4)$$

$$1.15<v_1/v_2<1.65 \quad (5)$$

where f is the focal length of the whole system;

$f_3$ is the focal length of the third lens;

$f_{12}$ is the composite focal length of the first and second lenses;

$f_{34}$ is the composite focal length of the third and fourth lenses;

$d_6$ is the distance between the sixth and seventh surfaces;

$v_1$ is the Abbe number of a material of the first lens; and $v_2$ is the Abbe number of a material of the second lens, wherein said imaging lens satisfies the following conditional expression (8):

$$0.05\leq|\beta|\leq 0.7 \quad (8)$$

where $\beta$ is the magnification of the whole system.

10. An image readout apparatus using the imaging lens according to claim 9.

* * * * *

UNITED STATES PATENT AND TRADEMARK OFFICE
CERTIFICATE OF CORRECTION

PATENT NO. : 6,310,734 B1
DATED : October 30, 2001
INVENTOR(S) : Ryoko Otomo, Takayuki Noda and Hiromitsu Yamakawa It is certified that error appears in the above-identified patent and that said Letters Patent is hereby corrected as shown below:

Title page,
ABSTRACT, line 29, delete "$v_1$ and $v_2$" and substitute therefore -- $\upsilon_1$ and $\upsilon_2$ --

Columns 2, 3, 5-9, 13-15,
Delete all references to "$v_d$" and substitute therefore -- $\upsilon_d$ --

Columns 2, 5, 6, 14, 16,
Delete all references to "$v_1$" and substitute therefore -- $\upsilon_1$ --
Delete all references to "$v_2$" and substitute therefore -- $\upsilon_2$ --

Column 15,
Line 9, delete "$\upsilon_d=(N_d-1) / (i\ \ N_F-N_C)$" and substitute therefore -- $\upsilon_d=(N_d-1) / (N_F-N_C)$ --

Signed and Sealed this

Thirtieth Day of April, 2002

*Attest:*

JAMES E. ROGAN
*Attesting Officer*     *Director of the United States Patent and Trademark Office*